(No Model.)

J. L. CREVELING.
CONDUIT RAILWAY TROLLEY.

No. 522,655. Patented July 10, 1894.

Witnesses:
Arthur E. Blaudt
Daniel L. Hurlbut

Inventor:
J. Levy Creveling
By Fred'k J. Allen
Attorney.

UNITED STATES PATENT OFFICE.

JOHN LEROY CREVELING, OF AUBURN, NEW YORK.

CONDUIT RAILWAY-TROLLEY.

SPECIFICATION forming part of Letters Patent No. 522,655, dated July 10, 1894.

Application filed April 5, 1894. Serial No. 506,493. (No model.)

*To all whom it may concern:*

Be it known that I, JOHN LEROY CREVELING, of the city of Auburn, New York, have invented certain new and useful Improvements in Electric Railways, of which the following is a description, reference being had to the accompanying drawings, forming part of this specification.

My invention relates to the trolley which takes the main line current, and it consists in a new construction of said trolley and in the proper disposition of the line wires so as to present them properly to the trolley.

Figure 1:
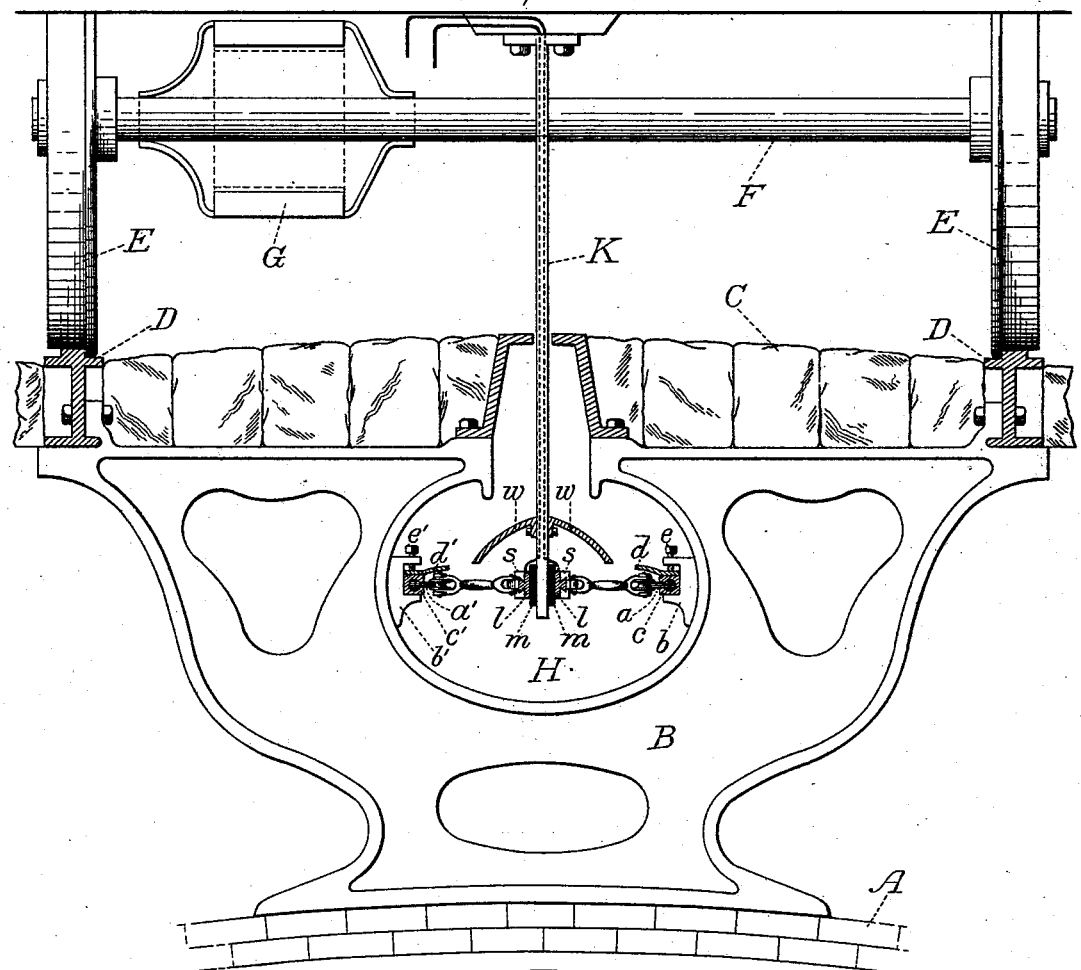

In the drawings Figure 1 is a transverse view of the roadway, A, representing the foundation, B, one of the usual track supporting yokes, C, the pavement, D, D, the rails secured to said yokes, E, E, the wheels F, and G, the axle and motor, respectively, of a car upon the same. The central openings, H, through the successive yokes, B, form a conduit within which the two line wires, $a$, $a'$ are carried, these wires connecting with the main driving dynamo, as is usual. These line wires are secured to the brackets, $b$, $b'$, by bolts, $e$, $e'$, and are secured within the insulating blocks $c$, $c'$, while covers, $d$, $d'$, protect them from moisture dropping upon them. I prefer to have these wires of the section shown, that is, a round wire provided with a flange, for the trolley to run on.

Figure 2:
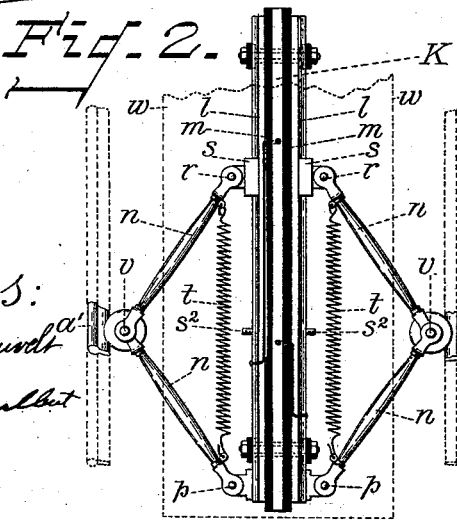

Fig. 2, is a plan view of the trolley. This consists of a vertical plate, K, preferably made of steel, secured beneath the frame of the car truck, and extending downward into the space, H, as shown. At the lower part of this plate, at each side thereof a slide, $l$, $l$, is secured, and insulated by a layer of non-conducting material, $m$. A pair of arms, $n$, $n$, on either side is pivoted at, $p$, to a portion of the slide, $l$, and at, $r$, to a block, $s$, which is fitted to slide on the way, $l$. A spring $t$, tends to draw $r$ and $p$, together. Trolley wheels, $v$, $v$, are pivoted to the outer ends of the arms $n$, $n$, as shown, and the wheel, $v$, is kept in close contact with the wire, $a$, by the spring, $t$. A hood, $w$, $w$, protects these parts from moisture from above. Insulated wires are led from the slide $l$, on one side, up through the central plate, K, (as shown by dotted lines in Fig. 1,) to the car motor, G, and returned through said central plate, K, to the slide, $l$, on the other side. These slides thus, through the wheels $v$, $v$, and arms, $n$, $n$, $n$, $n$, serving to convey the current from the wire $a$, to the wire $a'$. The pins, $s^2$, $s^2$, limit the travel of the blocks, $s$, $s$, toward the pivots $p$, $p$.

Having thus described my invention, what I claim as new, and desire to secure by Letters Patent, is—

1. An electric trolley, consisting of the depending plate, K, in combination with the trolleys, $v$, $v$, supported on either side thereof respectively by a pair of pivoted arms $n$, $n$.

2. In an electric railway, the combination of the trolley, comprising a dependent plate, K, the pivoted arms, $n$, $n$, $n$, $n$, slides, $l$, $l$, and wheels, $v$, $v$, with the two wires placed on either side of the conduit or subway, H.

J. LEROY CREVELING.

Witnesses:
J. C. DAVIS,
A. R. EDMONDSON.